United States Patent [19]

Nakamura

[11] Patent Number: 4,626,926

[45] Date of Patent: Dec. 2, 1986

[54] PRINTER USED FOR A TELEVISION RECEIVER

[75] Inventor: Shunichi Nakamura, Osaka, Japan

[73] Assignee: Mitsubishi Denki Kabushiki Kaisha, Tokyo, Japan

[21] Appl. No.: 617,601

[22] Filed: Jun. 5, 1984

[30] Foreign Application Priority Data

Jun. 8, 1983 [JP] Japan .................................. 58-103596
Nov. 2, 1983 [JP] Japan .................................. 58-206975
Nov. 28, 1983 [JP] Japan .................................. 58-225281
Nov. 28, 1983 [JP] Japan .................................. 58-225282

[51] Int. Cl.⁴ ........................ H04N 1/21; H04N 1/23; G01D 15/06
[52] U.S. Cl. .................................. 358/296; 358/283; 346/154
[58] Field of Search .............. 358/296, 298, 283, 339, 358/300–302; 346/154

[56] References Cited

U.S. PATENT DOCUMENTS

| | | | |
|---|---|---|---|
| 4,210,936 | 7/1980 | Cinque et al. | 358/283 |
| 4,500,928 | 2/1985 | Bucek et al. | 358/296 |
| 4,507,685 | 3/1985 | Kawamura | 358/283 |

Primary Examiner—E. A. Goldberg
Assistant Examiner—Patrick W. Foster
Attorney, Agent, or Firm—Birch, Stewart, Kolasch & Birch

[57] ABSTRACT

A printer used for a TV receiver, which printer comprises a memory for synchronously storing digital gradation density signals corresponding to the video signals in analog form received by the TV receiver; a read-out control circuit for reading out the digital signals stored in the memory; and a printer for printing out the signals read out by the read-out control circuit, thereby making copies of the images shown on the TV screen.

5 Claims, 13 Drawing Figures

| Transfer Time for 1st G.D.P. | -162 |
|---|---|
| " 2nd " | -12 |
| " 3rd " | -12 |
| " 4th " | -11 |
| " 5th " | -11 |
| " 6th " | -11 |
| " 7th " | -11 |
| " 8th " | -11 |
| " 9th " | -11 |
| " 10th " | -12 |
| " 11th " | -13 |
| " 12th " | -14 |
| " 13th " | -16 |
| " 14th " | -32 |
| " 15th " | -64 |

FIG. 9.

| 1st G.D.Pattern | 1 |
|---|---|
| 2nd " | 1 |
| 3rd " | 1 |
| 4th " | 1 |
| 5th " | 0 |
| 6th " | 0 |
| 7th " | 0 |
| 8th " | 0 |
| 9th " | 0 |
| 10th " | 0 |
| 11th " | 0 |
| 12th " | 0 |
| 13th " | 0 |
| 14th " | 0 |
| 15th " | 0 |

PRINTER USED FOR A TELEVISION RECEIVER

FIELD OF THE INVENTION

The present invention relates to a printer used for a television (hereinafter referred to merely as TV) receiver, and more particularly, to a printer for making printed copies of the pictures shown on TV screens.

BACKGROUND OF THE INVENTION

In general, there are T.V. programs for which the viewers want to record the broadcast information for future reference. For example, in a "How-To-Cook" program the housewives want to record the cooking information on the T.V. screens. However, under the present system of television receivers they have to write it down in their notebooks while watching the T.V. screen. This is very troublesome, and is actually a difficult task because they must catch up with the constant flow of the images on the screen, which go on without considering the viewer's convenience. Recently, videotape recorders have been developed, and it is true that they have solved this problem to a great extent. However, in reproducing the videotape it is necessary to search and select that part of the tape in which the information wanted by the viewer is recorded. As generally known, the re-playing of selected parts of the tape is time- and labor-consuming, so that housewives are often discouraged from reproducing the videotape in spite of the toil paid by them in recording.

OBJECTS AND SUMMARY OF THE INVENTION

The present invention is directed to solve the problems pointed out above, and has for its object to provide a printer used for a TV receiver so as to make printed copies of the pictures shown on the TV screen, thereby eliminating the inconvenience involved in note-taking and reproducing selected parts of the videotape.

According to one aspect of the present invention, there is provided a printer used for a TV receiver, the printer comprising:

a memory for storing gradation density digital signals corresponding to the video signals in analog form in the TV receiver;

a read-out control circuit for reading out the gradation density digital signals stored in the memory; and a printer for printing out the signals read out by the read-out control circuit, thereby making copies of the images shown on the TV screen.

DETAILED DESCRIPTION OF THE PREFERRED EMBODIMENT

Before entering into a detailed description, the basic principle of the present invention will be referred to:

When the images appearing on the TV screen are to be hard-copied, the copying speed is normally slower than the scanning speed of the video signals. As a result, it is necessary to convert the video signals into any suitable signals corresponding thereto, and store them in a memory temporarily. Finally, the stored signals are read out for print-out.

Figure 1:
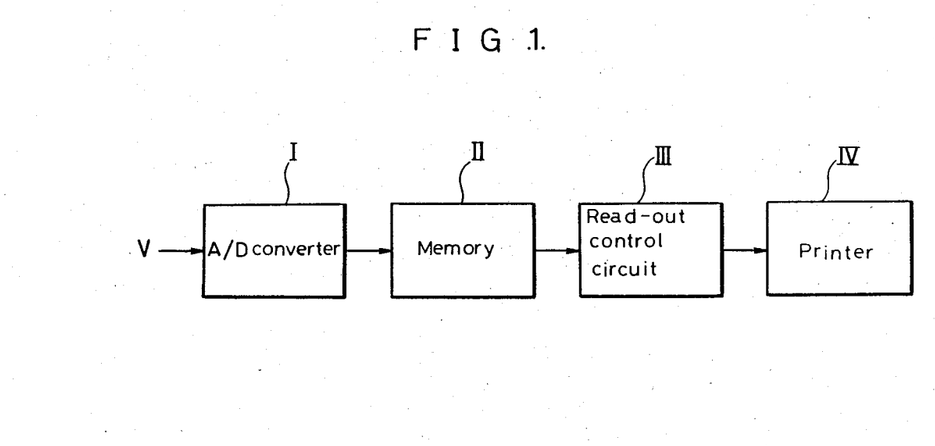
FIG. 1 is a block diagram exemplifying the basic principle of the present invention.

With this concept in mind the present invention has been made, and will be described in greater detail:

Referring to FIG. 1, there is provided an A/D (analog/digital) converter I which receives video signals V in analog form in a TV receiver at its input, and outputs digital gradation density signals in response to the input video signals V, wherein the gradation density signals are divided into a predetermined number of levels against the density of the video signals V; a memory II, which stores the gradation density signals from the A/D converter; a read-out control circuit III which reads out the gradation density signals stored in the memory; and a printer IV which prints out the signals read out by the read-out control circuit.

The A/D converter can be any type if it can output 16 gradation density signals, such as "0000", "0001",..., "1101",..., "1111" so as to represent 16-gradated densities in response to the video signals. A/D converters available in the market are effectively applicable. For the memory II a random-access-memory (RAM) can be effectively used.

First, reference will be made to a first method of writing the gradation density signals in the memory II under the above-mentioned system:

The gradation density signals from the A/D converter are stored in a shift register, and each of a plurality of picture elements, such as 4 elements, is written in its corresponding RAM of 4 sets of RAMs. Under this method, if the sampling is performed in one scanning line at 167 nsec. the picture elements in the scanning line will amount to 280. There are 234 scanning lines in one video field. As a result, four RAMs each having 16 Kbits are required. In addition, each of the picture elements has 16-gradated densities. Accordingly, four sets of RAMs are provided, and as a whole sixteen RAMs constitute the memory II.

A second method of writing in the memory II is performed by a page-mode access method. According to this method, at first a row address strobe signal (hereinafter referred to as RAS signal) is made "1", thereby providing a row address signal, and for the row address a column address strobe signal (hereinafter referred to as CAS signal) is periodically made "1". Each time when it is made "1", the column address signal is given, thereby effecting the column addressing. This page-mode address method is advantageous in that after a row address signal has been given, it is no longer necessary to repeat it, and it has only to give column address signals. This facilitates real-time writing. According to this method, it is possible to store gradation density signals for one video field in the four 64-Kbit RAMs, thereby reducing the required number of RAMs. Advantageously, four RAMs are effectively sufficient, which leads to simplicity and economy in production, particularly in comparison with the first-mentioned method under which each four picture elements are written in four RAMs at the same time. However, under the page-mode access method a period of time for which the RAS signal is "0" is 10 $\mu$sec at maximum. Furthermore, the 64-Kbit RAM has a disadvantage that if the column addresses exceed 256 addresses, it becomes necessary to give new address signals because of the change in the column address. As a result, it is required to change the RAS signals into "1" several times within one scanning line, and while it is "1", no data can be written in. The mere employment of the page-mode access method cannot solve this problem. In this case, it is likely that the pictures are void of the picture elements correspond to the unwritten data, which resulting in the abnormal images.

A third method of writing in the memory II is achieved as follows:

The gradation density signals obtained from the video signals are temporarily stored in the RAM under the page-mode access method, and the stored signals are read out for print-out, wherein the gradation density signals are input to a shift register, and wherein an output signal from the shift register which is delayed relative to the previous output therefrom by a period of time for which the RAS signal is selected for input to the RAM after each row address signal is generated in one scanning line of the video signals. According to this method the images of the TV receiver are automatically printed out with the use of a small number of RAMs. In addition, the images on the print are very normal.

Figure 2:
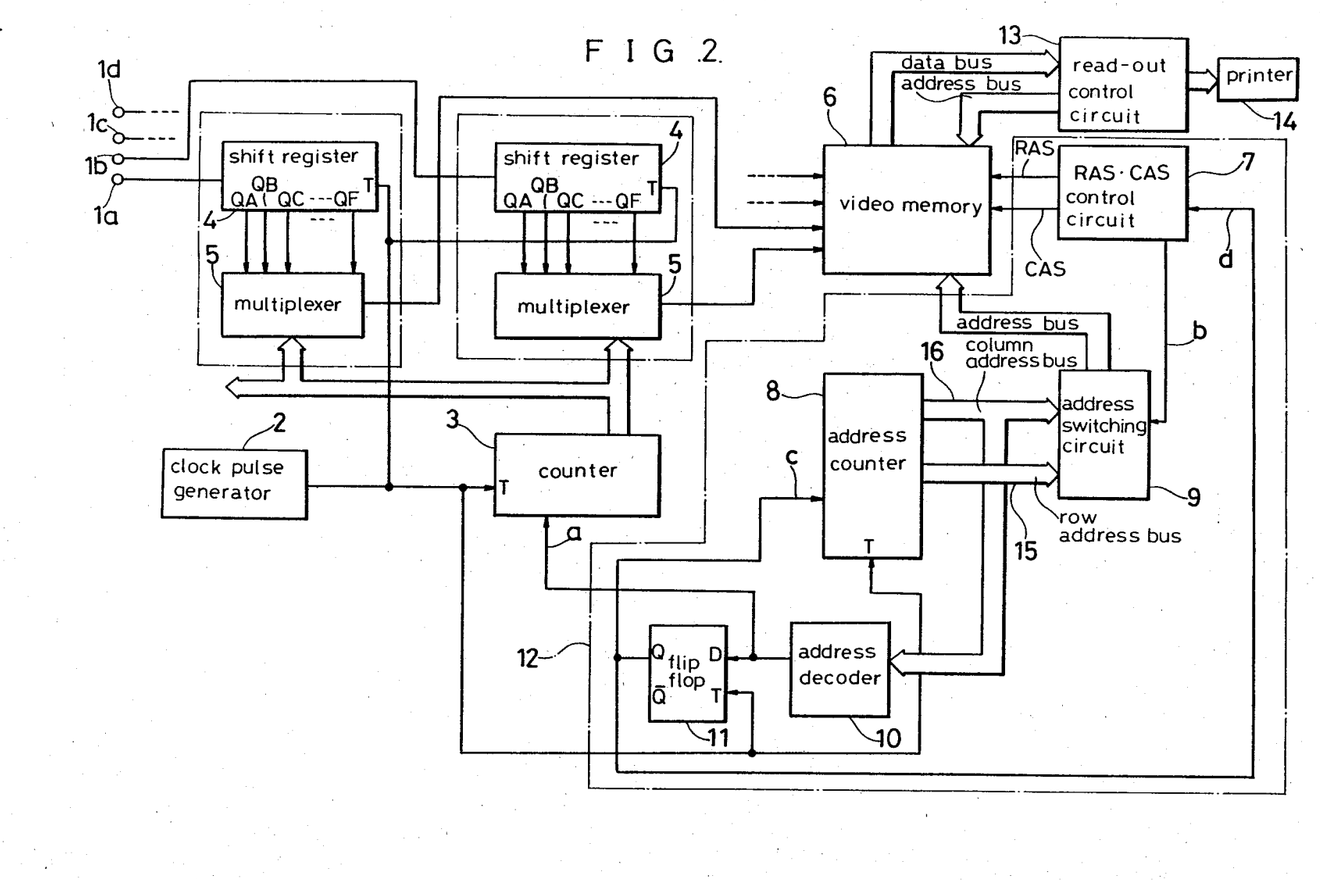
FIG. 2 is a block diagram illustrating a printer embodying the present invention.
Figure 3:
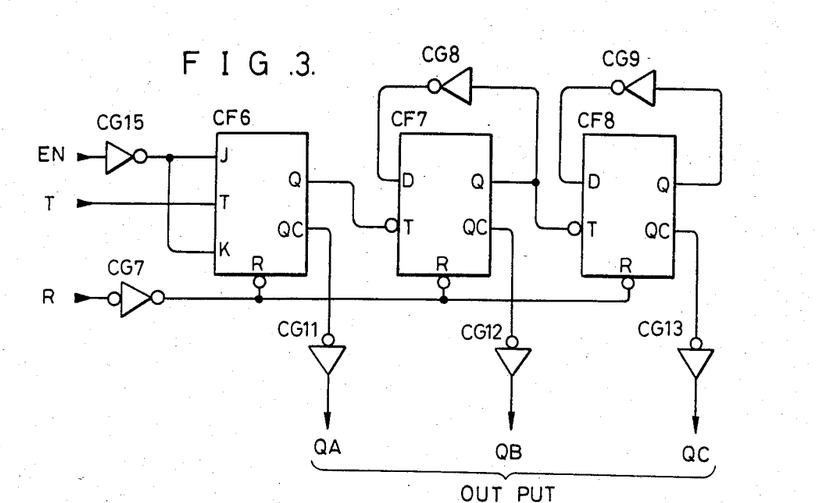
FIG. 3 is a circuit diagram of a counter used in the printer of FIG. 2.
Figure 4:
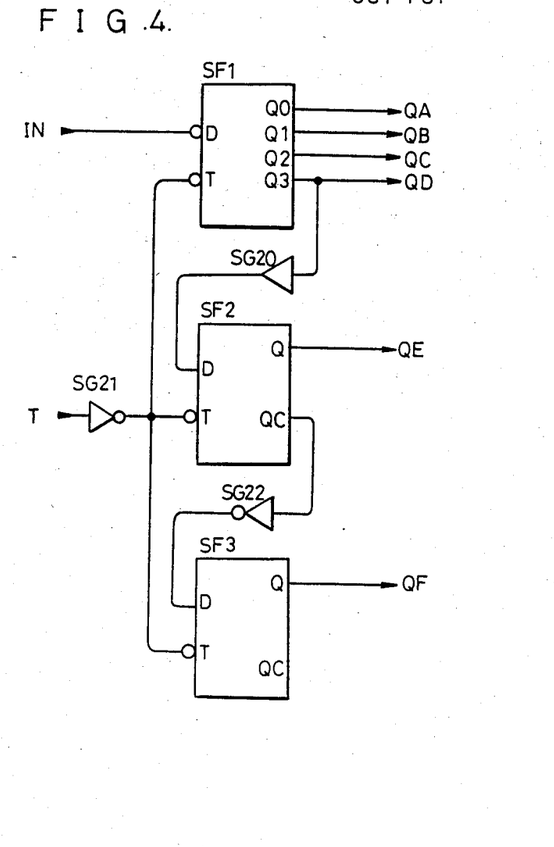
FIG. 4 is a circuit diagram of a shift register used in the printer of FIG. 2.
Figure 5:
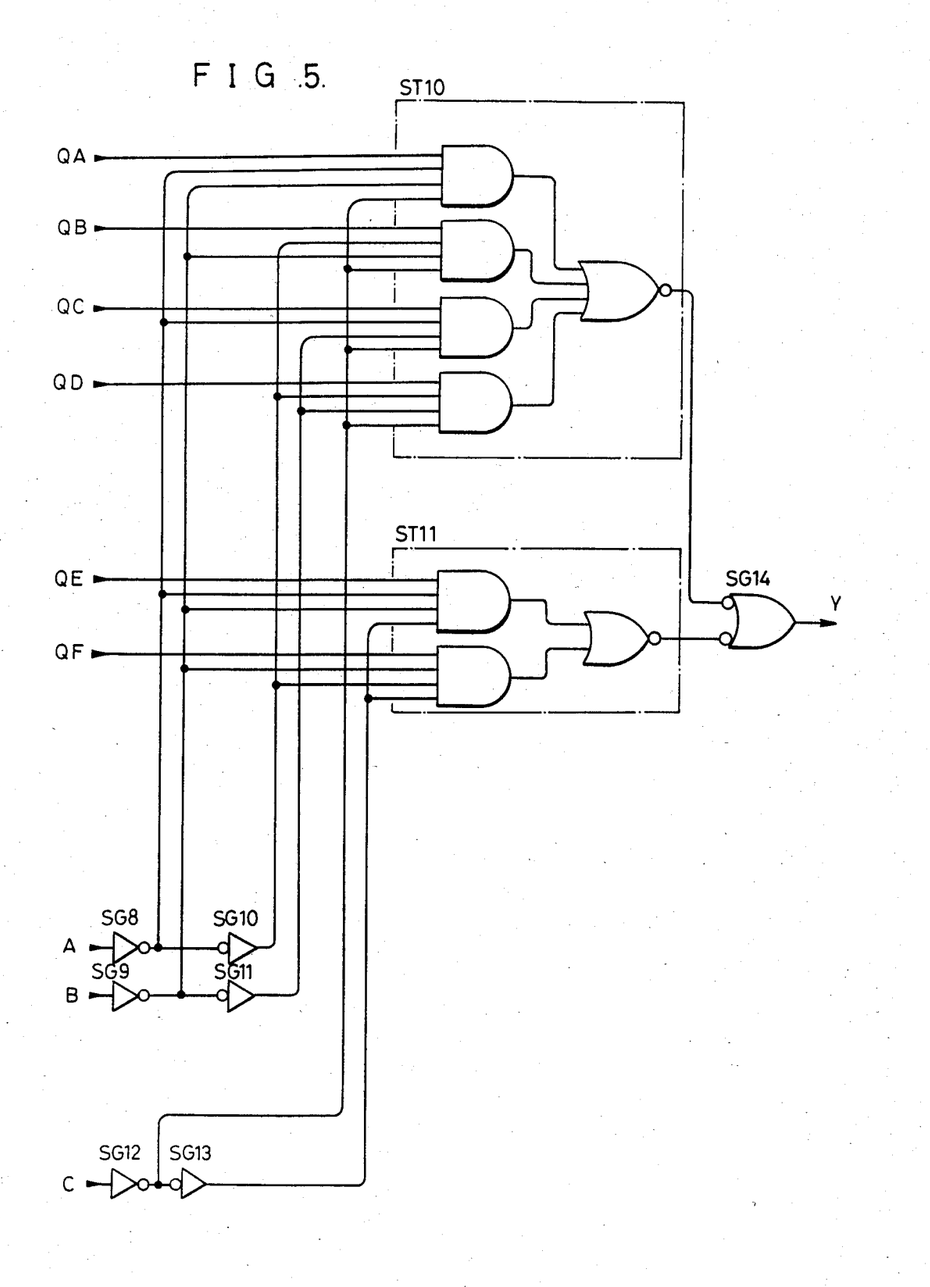
FIG. 5 is a circuit diagram of a multiplexer used in the printer of FIG. 2.

This third method of writing in the memory II will be more particularly described with reference to FIGS. 2 and 3:

The reference numerals 1a to 1d each designate serial writing data, which is each bit of 4-bit gradation density signals. As described above, these gradation density signals are those which are obtained by converting video signals into digital signals by the A/D converter, and consist of sixteen signals of "0000", ..., "1111" so as to represent 16-gradated densities corresponding to the video signals. The reference numeral 2 designates a clock pulse generator which generates clock signals having a period of 167 nsec. The reference numeral 3 designates a counter which counts the clock signals for a period of time when the count-enable signal a is input thereto, an example of which is illustrated in FIG. 3. In FIG. 3, the reference symbols CG7 to CG15 designate logic gates, and the reference symbols CF6 to CF8 designate flip-flops, respectively. There are provided four shift registers 4, to each of which the writing data 1a to 1d are input at timings of its own clock signals. The data 1a to 1d are output from the output QA of each shift register 4, whereas from each of the outputs QB to QF the data 1a to 1d are output with a delay of a predetermined time. An example of the shift register 4 is illustrated in FIG. 4. In FIG. 4 showing a 6-bit shift register, the reference symbols SG20 to SG22 designate logic gates, and the reference symbols SF1 to SF3 designate flip-flops, respectively. The reference numeral 5 designates multiplexers located in opposition to the outputs QA to QF of the shift registers 4, the multiplexers selectively outputting signals from the outputs QA to QF in accordance with the values counted by the counter 3, an example of which is illustrated in FIG. 5. In FIG. 5 showing a 6-bit multiplexer, the reference symbols SG8 to SG14 designate logic gates, and the reference symbols ST10 to ST11 designate logical circuits, respectively. In the FIG. 2 the shift registers and the multiplexers to which the data 1c and 1d are to be input are omitted for simplicity.

Figure 6:
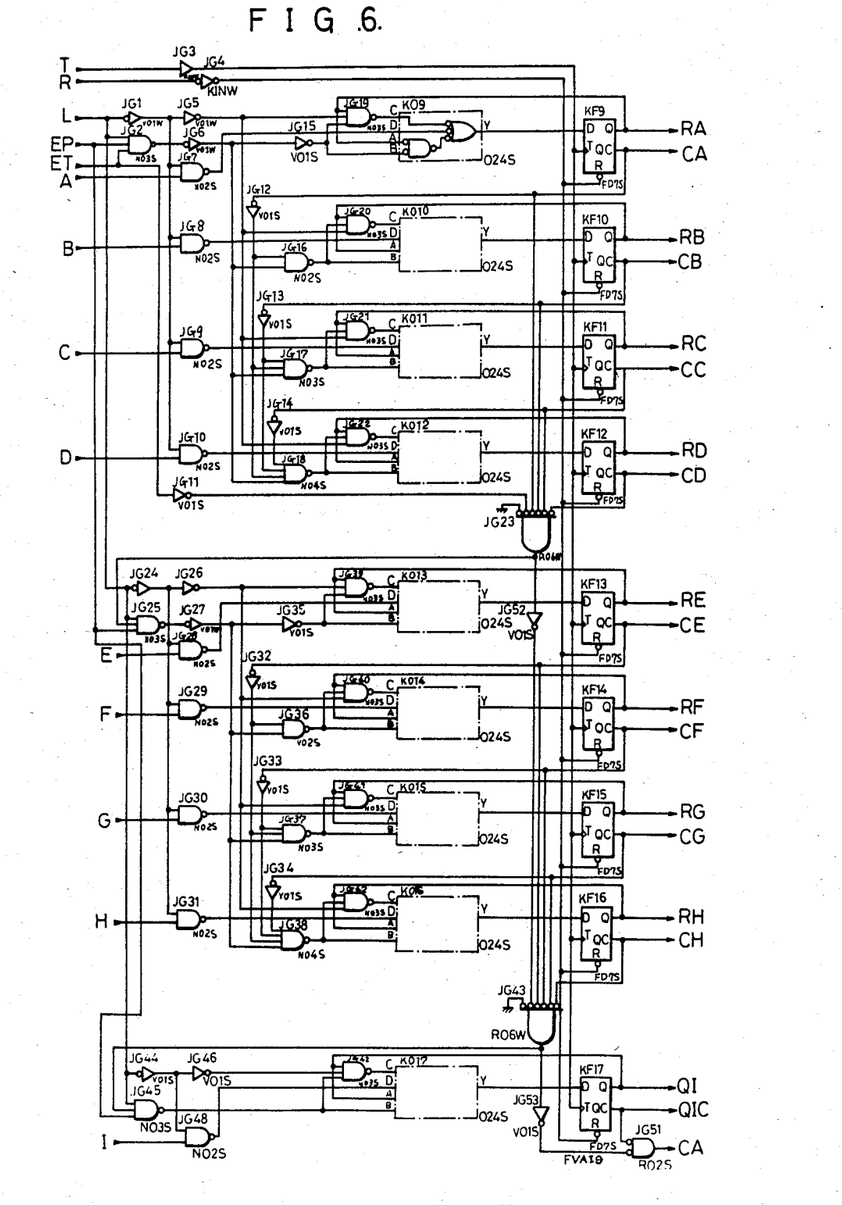
FIG. 6 is a circuit diagram of an address counter used in the printer of FIG. 2.
Figure 7:
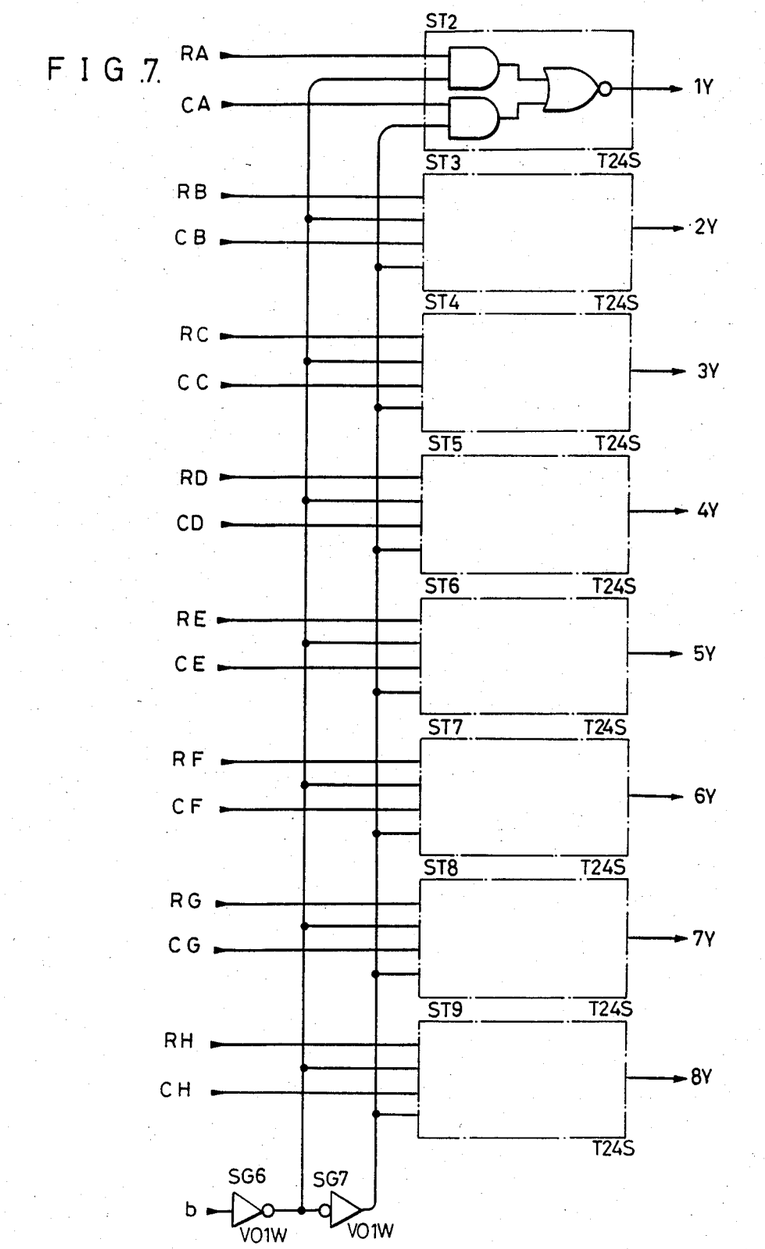
FIG. 7 is a circuit diagram of an address switching circuit used in the printer of FIG. 2.
Figure 8:
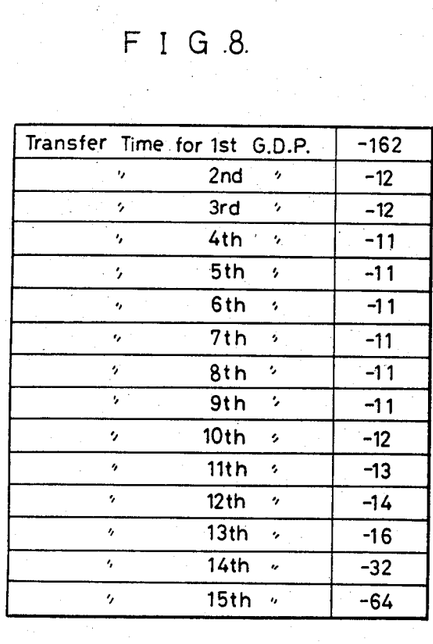
FIG. 8 is a time table showing the transfer time for each gradation density pattern.
Figure 9:
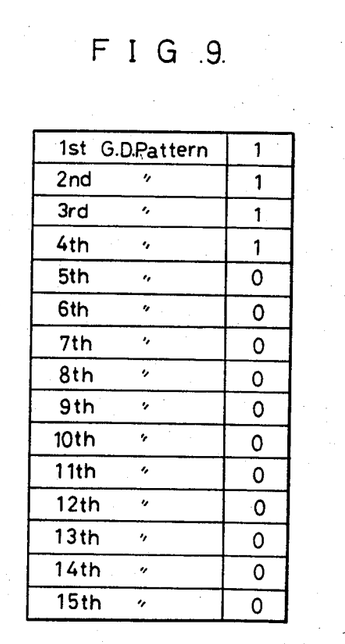
FIG. 9 is a table showing the relation between the gradation density patterns and the signal of "1" or "0" used in an operation of the printer of FIG. 2.
Figure 10:
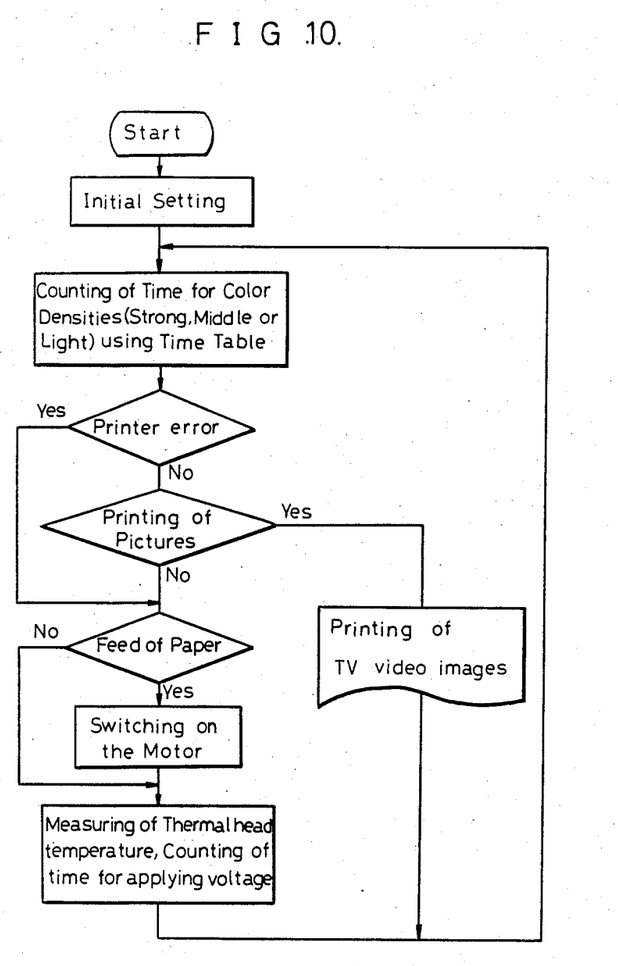
FIG. 10 is a flow chart showing the operation of the read-out control circuit shown in FIG. 2.
Figure 12:
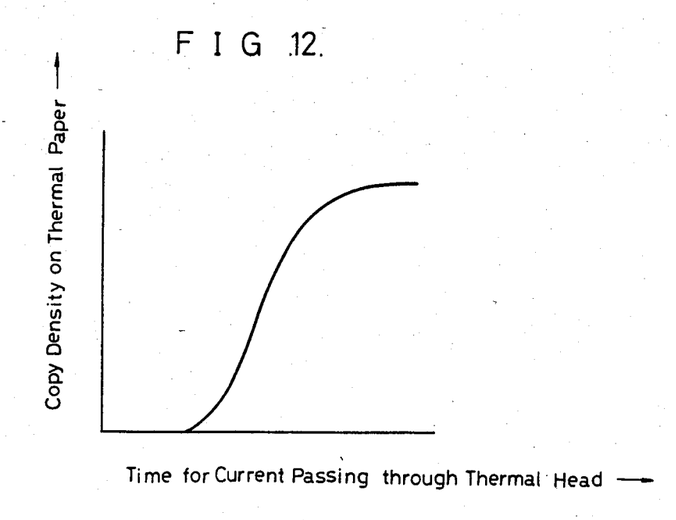

There is provided a video memory 6, which stores gradation density signals to be printed out. The outputs from the multiplexers 5 are input to the video memory 6, which consists of four 64-Kbit RAMs. The reference numeral 7 designates a RAS/CAS control circuit, which delivers to the video memory 6 RAS signals (row address strobe signals) and CAS signals (column address strobe signals), and generates address switching signal b. The reference numeral 8 designates an address counter, which counts up clock signals and generates an 8-bit row address signal as the upper address as well as an 8-bit column address signal as the lower address, an example of which is illustrated in FIG. 6. In FIG. 6, the reference symbols JG1 to JG53 designate logic gates, the reference symbols KO9 to KO17 designate logical circuits, and the reference symbols KF9 to KF19 designate flip-flops, respectively. The reference numeral 9 designates an address switching circuit, which delivers to the video memory 6 either the row address signal or the column address signal in accordance with an address switching signal b from the RAS/CAS control circuit 7, wherein the row or the column address signal is delivered from the address counter 8. An example of the address switching circuit 9 is illustrated in FIG. 7. In FIG. 7 the reference symbols SG6 and SG7 designate logic gates, the reference symbols ST2 to ST9 designate flip-flops, respectively. The reference numeral 10 designates an address decoder, to which the column address signal is input, and which outputs the signal "1" each time when thirty-two column addresses are output therefrom. The address decoder 10 is constituted by a NOR circuit. The reference numeral 11 designates a flip-flop, which outputs the signal "1" in synchronism with the next clock from the clock pulse generator 2 in response to the signal "1" output by the address decoder 10. The signal "1" of the flip-flop 11 becomes a count-disenable signal c and a control signal d directed to the RAS/CAS control circuit 7. In FIG. 12 the frame defined by dotted lines 12 is an writing address control circuit. This circuit 12 is designed to deliver row address signals to the video memory 6, at each beginning of the row and subsequently at time-intervals not exceeding 10 $\mu$sec for the same row, and also to count up and deliver column address signals except when it delivers the row address signals. The reference numeral 13 designates a read-out control circuit which reads out the gradation density signals stored in the video memory 6, which includes a memory section in which such a time table as shown in FIG. 8 is stored, a CPU including a counter capable of counting up the counts corresponding to the transfer time shown in FIG. 8 stored in the memory section, wherein one count is 5.5 $\mu$s, and a head drive circuit operating on the output from the CPU. For example, when a "0100" signal whose gradation density is 4 is output from the video memory 6, the 1st to 4th gradation density patterns (hereinafter referred to as GDP1 to GDP4) are represented by signal "1", whereas 5th to 15th gradation density patterns (GDP5 to GDP15) are represented by signal "0" in the CPU, and the output "1" is output from the counter in the CPU for a period of time which corresponds to the sum of the transfer times for gradation density patterns for which the signal is made "1", that is, the patterns from GDP1 to GDP4 in this case, with which output "1" the head drive circuit is driven. FIG. 10 shows a flow chart of the operation in sequence of the read-out control circuit 13.

Figure 11:
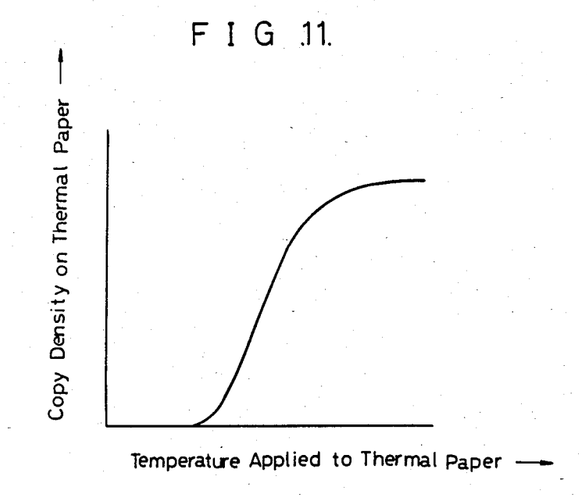
FIGS. 11 and 12 are graphs showing the relationship between the optical density on a thermal paper and the applied temperature thereto, and between the optical density on a thermal paper and the time for current passing through thermal paper.

The reference numeral 14 designates a printer which prints out the signals read out by the read-out control circuit 13. The printer can be a thermal printer with a thermal head. The paper on which data is printed is susceptible to temperature, and changes its color density as shown in FIG. 11. The temperature of the thermal head is proportional to the applied voltage squared and also to the time for which an electric current passes through the thermal head. When the applied voltage is constant, it is exclusively proportional to the current passing time. The relationship between the color density on the paper and the current passing time is as shown in FIG. 12. As a result, the thermal head is energized for a period of time based on the gradation density signals input from the read-out control circuit 13 with the relation shown in the time table, wherein the thermal head is constructed of thermal thyristor. In this way the characters are printed on the paper with density depending on the gradation density signals or in other words, the video signals.

Figure 13:
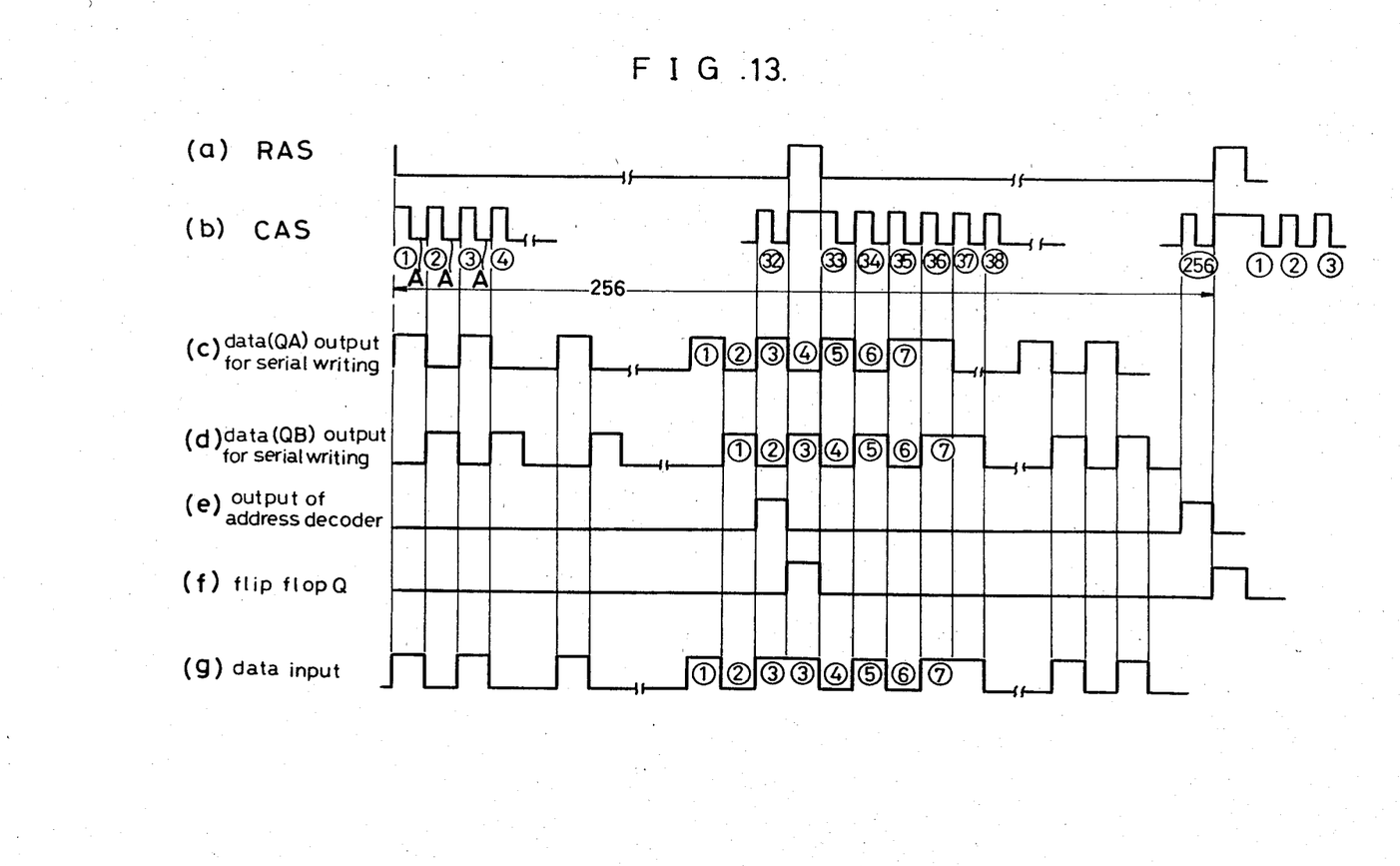
FIG. 13 is a timing diagram exemplifying the sequence of operation of the system illustrated in FIG. 2.

Referring to FIG. 13, which shows a timing diagram of the input and output signal in each element, the operation of the system will be described:

When the copy key (not shown) is turned on, the writing data 1a to 1d in the first scanning line are input to the shift registers 4 at timings of clock pulses from the clock pulse generator 2. The multiplexer 5 selects the QA output of the shift register 4, and the non-delayed 4-bit data 1a to 1d from the QA output are output to the video memory 6 in such timing as shown in FIG. 13 (c). In the writing address control circuit 12 the RAS signal is delivered to the video memory 6 from the RAS/CAS control circuit 7 as shown in FIG. 13 (a). In response to the address switching signal b from the RAS/CAS control circuit 7 the address switching circuit 9 selects the row address bus 15, and the row address signal from the address counter 8 is delivered to the video memory 6 in synchronism with the falling of the RAS signal. In response to the delivery of the row address signal the CAS signal is delivered to the video memory 6 from the RAS/CAS control circuit 7 as shown in FIG. 13 (b). At the same time the address switching circuit 9 selects the column address bus 16 in accordance with the address switching signal b from the RAS/CAS control circuit 7, and the column address signal from the address counter 8 which counts up the clock signals is delivered to the video memory 6 in synchronism with the falling of the CAS signal. When the column address is established (Refer to A in FIG. 13 (b)), the non-delayed data 1a to 1d from the multiplexer 5 are written in the video memory 6.

The column address signal from the address counter 8 is also input to the address decoder 10, and when the 32nd column address signal is delivered to the video memory 6, thereby allowing the 32nd data 1a to 1d to be written in the video memory 6, the signal of the address decoder 10 becomes "1" at the reception of the 32nd column address signal as shown in FIG. 13 (c). The signal "1" is input to the flip-flop 11, and at the same time, it is added to the counter 3 as the count-enable signal a, thereby causing the counter 3 to count the clock signals, and the multiplexer 5 selects the 1-bit delayed QB output of the shift register 4 in accordance with the value counted by the counter 3, and in such timing as shown in FIG. 13 (d) the 1-bit delayed data 1a to 1d are written in the video memory 6 (FIG. 13 (g)). At this time the writing address control circuit 12, as shown in FIG. 13 (f), allows the flip-flop 11 to output the signal "1" in synchronism with the next clock signal in response to the signal "1" generated by the address decoder 10. The signal "1" is added as the count-disenable signal c to the address counter 8, which stops its operation after having counted the clock signal. At the same time the signal "1" of the flip-flop 11 is added as the control signal d to the RAS/CAS control circuit 7, from which the RAS signal is added to the video memory 6. In addition, in accordance with the address switching signal b from the RAS/CAS control circuit 7 the address switching circuit 9 selects the row address bus 15, thereby delivering the same row address signal as the initial one, to the video memory 6. Then, the CAS signal and the column address signal are delivered to the video memory 6 in the same manner. In this way the 1-bit delayed data 1a to 1d are written in the video memory 6, wherein the 1-bit delay corresponds to the period of time for which the row address signal is added to the video memory in the above-mentioned manner. Each time when the thirty-two data 1a to 1d are written in the video memory 6, the RAS signal becomes "1", and the row address signals in this particular row are delivered, and afterwards a 1-bit delayed data 1a to 1d are written in.

When the data 1a to 1d are written in the last address "255" among the 0-to-255 addresses in the first row of the video memory, the address signal for the last address "255" (which is the 256th address, amounting to the integral multiplication of 32) allows the signal of the address decoder 10 to become "1". At the next clock pulse the signal of the flip-flop 11 becomes "1", and the address counter 8 counts 256 and stops its operation. Immediately upon the stoppage of the counting, the RAS signal is added to the video memory 6. Simultaneously, the row address signals of the second row are delivered thereto, and the remaining data 1a to 1d of the first scanning line are also written in these addresses of the second row.

If the scanning lines to be written vary, the output selected by the multiplexer 5 returns to the QA output of the shift register 4, and the data 1a to 1d of the varied scanning lines are written in the video memory 6 in the same manner as described above.

When the data 1a to 1d of one field are completely written in the video memory 6, the read-out control circuit 13 starts to read the data 1a to 1d in this field one after another, and based on each data, outputs the data so as to control the time for which the thermal head is energized. In this way the printer 14 prints out the data in one field, thereby allowing each image to be hard-copied.

As evident from the foregoing description, according to the present invention it is easy to make hard-copies of the pictures on a T.V. screen, which provides a great facility for T.V. viewers. Each time when the row address signal is generated, that output of the shift register which is delayed by a period of time for a row address strobe signal to deliver this particular row address signal, is selected and written in the video memory 6. This ensures that all the gradation density signals can be stored in sequence and at exact positions, thereby creating a normal clear picture. In addition, real-time writing is possible, and therefore, the number of RAMs used is considerably reduced, thereby resulting in economical production costs. In this regard the present invention is more advantageous than the conventional method in which the picture elements are converted into parallel data and written in the video memory.

The present invention is not limited to the embodiment described above, but as referred to in the beginning, various changes and modifications within the spirit and scope of the invention are possible: For example, the time for the RAS signal being "1" is not limited to a time for 1 bit, but may be a time for multiple bits. The gradation number of gradation densities is not limited to 16, but may be other gradation number. In general, when the gradation number is $2^n$, the video memory can be constructed with n pieces of RAMs.

What is claimed is:

1. A printer used for a TV receiver, the printer comprising:
    a writing address control circuit for generating row address signals, and column address signals except when generating the row address signals;
    a shift register to which digital signals corresponding to video signals of TV signals are input, and which outputs the input digital signals as non-delayed output signals and delayed signals which are delayed by a strobe signal time which is required for delivering the row address;
    a multiplexer to which the outputs of the shift register are input, and which generates output signals delayed relative to any previous outputs therefrom by a strobe signal time which is required for delivering the row address when and after each row address signal is generated;
    a video memory to which the output signals of the multiplexer are input, and which stores the signals input in accordance with the row and column address signals from the writing address control circuit;
    a read-out control circuit for reading out the signals stored in the video memory; and
    a printer for printing out the signals read out by the read-out control circuit.

2. A printer as defined in claim 1, wherein the digital signals are gradation density signals established in accordance with related densities of the video signals of the TV receiver.

3. A printer used for a TV receiver, the printer comprising:
    a writing address control circuit for generating row address signals at each beginning of a row and subsequently at time-intervals not exceeding a predetermined period of time for the same row, and for counting up and generating column address signals except when generating the row address signals;
    a shift register to which gradation density signals corresponding to the video signals of the TV receiver are input, and which outputs input digital signals as non-delayed output signals and delayed output signals which are delayed by a strobe signal time which is required for delivering a row address;
    a multiplexer to which the outputs of the shift register are input, and which generates output signals delayed relative to previous outputs therefrom by a strobe signal time which is required for delivering the row address when and after each row address signal is generated from the writing address control circuit;
    a video memory to which the output signals of the multiplexer are input, and which stores the signals input in accordance with the row and column address signals from the writing address control circuit;
    a read-out control circuit for reading out the signals stored in the video memory; and
    a printer for printing out the signals read out by the read-out control circuit.

4. A printer as defined in claim 3, wherein the number of gradation density levels is $2^n$, and wherein the video memory comprises n separate RAMs.

5. A printer used for a TV receiver, the printer comprising:
    a writing address control circuit for generating row address signals at each beginning of a row and at each address exceeding the row, and for counting up and generating column address signals except when generating the row address signals;
    a shift register to which gradation density signals corresponding to the video signals of the TV receiver are input, and which outputs input digital signals are non-delayed output signals and delayed output signals which are delayed by a strobe signal time which is required for delivering the row address;
    a multiplexer to which the outputs of the shift register are input, and which generates output signals delayed relative to previous outputs by a strobe signal time which is required for delivering a row address when and after each row address signal is generated within one scanning line of the video signal;
    a video memory to which the output signals of the multiplexer are input, and which stores the signals input in accordance with the row and column address signals from the writing address control circuit;
    a read-out control circuit for reading out the signals stored in the video memory; and
    a printer for printing out the signals read out by the read-out control circuit.

* * * * *